United States Patent [19]
Pool

[11] Patent Number: 5,368,621
[45] Date of Patent: Nov. 29, 1994

[54] FILTERING AIR CLEANER COVER FOR INTERNAL COMBUSTION ENGINE

[76] Inventor: Stephen R. Pool, 1516 S. Marvin, Tucson, Ariz. 85710

[21] Appl. No.: 115,212

[22] Filed: Aug. 31, 1993

[51] Int. Cl.[5] .............................................. B01D 29/07
[52] U.S. Cl. ..................................... 55/323; 55/385.3; 55/488; 55/498; 123/198 E
[58] Field of Search ...................... 55/323, 385.3, 493, 55/497, 498, 521, 321, 324, 327, 482, 486, 489, 488, DIG. 28; 123/198 E

[56] References Cited

U.S. PATENT DOCUMENTS

| | | | |
|---|---|---|---|
| 2,822,059 | 2/1958 | Lunn et al. | 55/387 |
| 3,871,847 | 3/1975 | Fish | 55/482 X |
| 4,211,543 | 7/1980 | Tokar et al. | 55/497 X |
| 4,236,901 | 12/1980 | Kato et al. | 55/497 X |
| 4,487,606 | 12/1984 | Leviton et al. | 55/482 X |
| 4,704,143 | 11/1987 | Percy | 55/482 X |
| 4,713,097 | 12/1987 | Grawi et al. | 55/497 X |
| 4,929,263 | 5/1990 | Kasugai | 55/497 X |
| 4,995,891 | 2/1991 | Haynes | 55/484 X |

*Primary Examiner*—Richard L. Chiesa
*Attorney, Agent, or Firm*—Ogram & Teplitz

[57] ABSTRACT

A filter cover for an air cleaner assembly of an internal combustion engine. The filtering cover is composed substantially of filtering material which filters air as the air is drawn through the filtering cover and into the air cleaner assembly. The filtering cover greatly increases the air filtering surface area of an air cleaner assembly resulting in improved performance and operation of the engine.

12 Claims, 4 Drawing Sheets

FILTERING AIR CLEANER COVER FOR INTERNAL COMBUSTION ENGINE

BACKGROUND OF INVENTION

This invention relates generally to air filtering devices and more specifically to air cleaners for internal combustion engines.

Dirt is very damaging to internal combustion engines. Even small amounts and very small particles can seriously damage an engine. Some dirt particles act as abrasives, causing excessive wear and tear on the internal parts of the engine. Other dirt particles clog or corrode critical components also causing serious damage or malfunctions.

To combat this problem numerous filters have been incorporated into engines to protect them from contaminants. These filters include air filters, oil filters, gas filters and the like.

Of particular relevance to this disclosure are the current state of the art air cleaners typically utilized in motor vehicles. Many of these air cleaners are inefficient and degrade the performance of an engine. They either excessively restrict airflow to the engine, do not adequately clean the air before it enters the engine, or both.

When air flow to the engine is restricted, engine performance is reduced. This translates into reduced power, reduced mileage, increased emissions, etc.

When air entering the engine contains contaminants, engine wear and tear is accelerated. Excessive wear and tear leads to reduced engine efficiency, increased emissions, and possibly premature engine failure.

One factor affecting air filter designs is the trade-off between filter efficiency and restriction of air flow. Filters which are more effective at filtering dirt particles from the air necessarily are more restrictive of the air flow through them. To overcome this restriction, filters have been enlarged and corrugated to maximize the filtering surface area and provide satisfactory filtering and air flow for normal engine operation. However, many air cleaners remain deficient at effectively filtering air and at minimizing restriction to the air flow.

Clearly, there exits a need for an improved air cleaner for internal combustion engines that has increased filtering surface area, more effectively filters air and increases air flow to the engine.

SUMMARY OF INVENTION

The invention creates a filtering cover for an air cleaner assembly of an internal combustion engine. The filtering cover is comprised substantially of filtering material for filtering air as the air is drawn through the filtering cover and into the air cleaner assembly. The filtering cover greatly increases the air filtering surface area of an air cleaner assembly resulting in improved performance and operation of the engine.

For descriptive purposes, a conventional air cleaner comprises a generally bowl shaped body and a removable cover which enclose an air filter element. The removable cover for the bowl shaped body permits removal and replacement of a, usually, cylindrical air filter element. The bowl shaped body has an air inlet opening in its side wall and an air outlet opening in its bottom. Air is drawn into the air cleaner through the air inlet, through the cylindrical air filter, out the air outlet and into the engine. The cylindrical air filter is periodically replaced as it becomes dirty.

The invention improves conventional air cleaners by replacing the removable cover with a filtering cover which functions as both an additional air inlet to the air cleaner and as an added filtering element.

The filtering material used is any of the filtering materials well known in the art, including both the dry type filters and the wet (or oil) type. The filtering material is also either the disposable paper type or the reusable type. In the preferred embodiment, the filtering material is corrugated such that the filtering surface area is increased for the given size of the cover.

In operation of an air cleaner using the invention, contaminated air is drawn through the filtering cover and into the interior of the air cleaner. A first portion of this (now filtered) air is drawn directly out through the air outlet and into the engine. A second portion of the filtered air is drawn through the cylindrical air filtering element which filters this air a second time. This second portion of filtered air is then also drawn out of the air cleaner through the air outlet and into the engine.

In an alternate embodiment, all air drawn through the filtering cover is doubly filtered. That is, all the contaminated air drawn through the filtering cover is also drawn through the cylindrical air filter before entering the engine.

An added benefit of the invention is that air drawn through the cover is evenly distributed around the cylindrical air filter improving the performance (filtering and air flow) of the cylindrical air filter. This reduces the "dirty areas" of the cylindrical air filter which normally accumulate on the portion of the cylindrical air filter nearest the air inlet.

The invention is easily retrofit to existing air cleaners.

Several embodiments of the invention are illustrated in the figures and described more fully below.

DETAILED DESCRIPTION OF THE PREFERRED EMBODIMENTS

Figure 1:
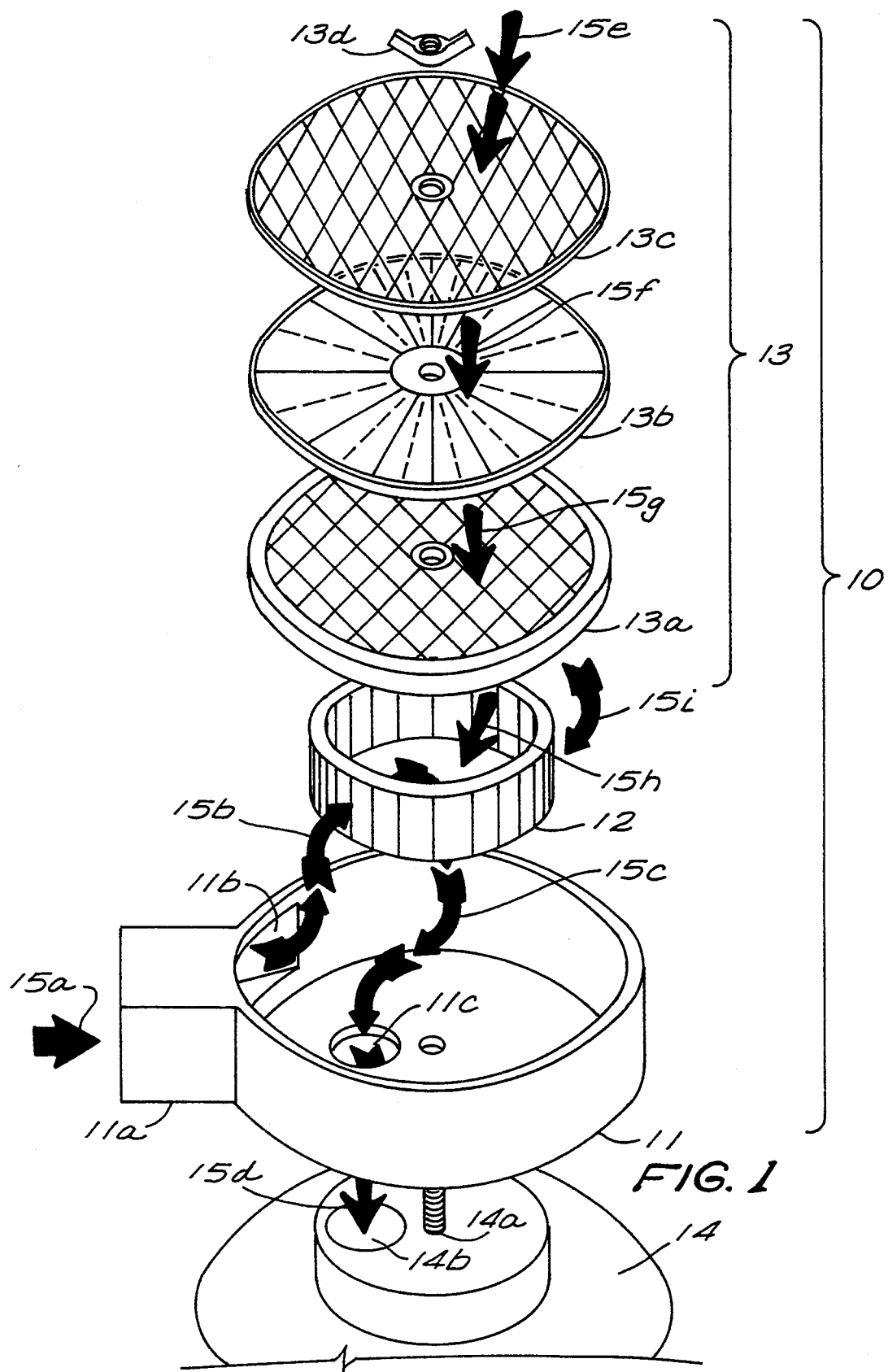
FIG. 1 is an exploded view of the filtering cover, air cleaner and engine.

FIG. 1 shows an exploded view of the filtering cover, the air cleaner and the engine.

The air cleaner assembly 10 is comprised of air cleaner body 11, snorkel 11a, cylindrical air filter 12 and filtering cover 13. Filtering cover 13 is comprised of perforated frame 13a, filtering element 13b, retaining means 13c and wing nut 13d. The entire air cleaning assembly 10 mounts to engine 14 via air cleaner bolt 14a.

The operation of air cleaner body 11 and cylindrical air filter 12 is well known in the art. In the prior art, cylindrical air filter 12 is positioned in air cleaner body 11 which is covered with a non-perforated cover (not shown). Contaminated air is drawn into air cleaner assembly 10 via snorkel 11a and air inlet 11b as shown by arrows 15a and 15b. The contaminated air is drawn through cylindrical air filter 12. The now filtered air is drawn through air outlet 11c and into engine 14 as shown by arrow 15c and 15d. In the prior art, much of the contaminated air is filtered through the portion of cylindrical air filter 12 nearest air inlet 11b causing contaminants to accumulate excessively in this area causing reduced filter efficiency and reducing filter life.

In contrast to the prior art, the invention provides an additional air inlet path to air cleaner 10. When filtering cover 13 is utilized, contaminated air is drawn through filter retaining means 13c, filtering element 13b and perforated frame 13a as shown by arrows 15e, 15f and 15g. The filtered air is then either drawn directly through air outlet 11c and into engine inlet 14b as shown by arrows 15h, 15c and 15d or is drawn through cylindrical air filter 12, to be filtered a second time, as shown by arrow 15i.

In the preferred embodiment, filtered air moves as shown by arrows 15h and 15i (i.e. some air is filtered only by filtering cover 13 and some air is filtered by both the filtering cover 13 and cylindrical air filter 12). In an alternate embodiment of the invention, all air drawn through filtering cover 13 is diverted so that it is filtered a second time by cylindrical air filter 12. Both embodiments are shown in detail below.

Perforated frame 13a rests atop air cleaner body 11 and supports filtering element 13b. Perforated frame 13a is made of any design which allows air to move through it with little restriction while also providing adequate support to filtering element 13b. Those of ordinary skill in the art readily recognize many designs suitable for this purpose including, but not limited to, drilling numerous holes in the cover, utilizing screening material, using cross bars to support the filtering element, etc.

Perforated frame 13a is made of any material suitable for supporting the filter element 13b as shown including metal and plastic material. In an alternate embodiment, perforated frame 13a is rubberized (i.e. coated in rubber or plastic type material) which reduces wear and tear between perforated frame 13a and filter element 13b.

Perforated frame 13a forms an air tight seal to cylindrical air filter 12. This is necessary to prevent contaminated air entering air inlet 11b from bypassing cylindrical air filter 12 and entering the engine 14.

Filter element 13b is made of any suitable filtering material known in the art for filtering air. The preferred embodiment utilizes semi-permanent polyurethane foam type material which is reusable. When this material becomes dirty, it is washed, soaked in engine oil, the excess oil is wrung out and the filter replaced. An alternate embodiment uses replaceable paper type material. When this paper filter material become dirty, it is disposed of and replaced with a new filter. Both embodiments envision corrugating the filter material to increase the filtering surface area for the given area.

Retaining means 13c secures filter element 13b to perforated frame 13a. Those skilled in the art readily recognize many alternate embodiments for retaining means 13c. The preferred embodiment uses screen type material which is secured by wing nut 13d. In one alternate embodiment, the retaining means and replaceable filter element are essentially combined such that no independent retaining means is necessary.

Wing nut 13d attaches to air cleaner bolt 14a and secures the entire air cleaner assembly 10 to engine 14. Wing nut 13d is low profile so as to minimize the height of the invention.

Figure 2:
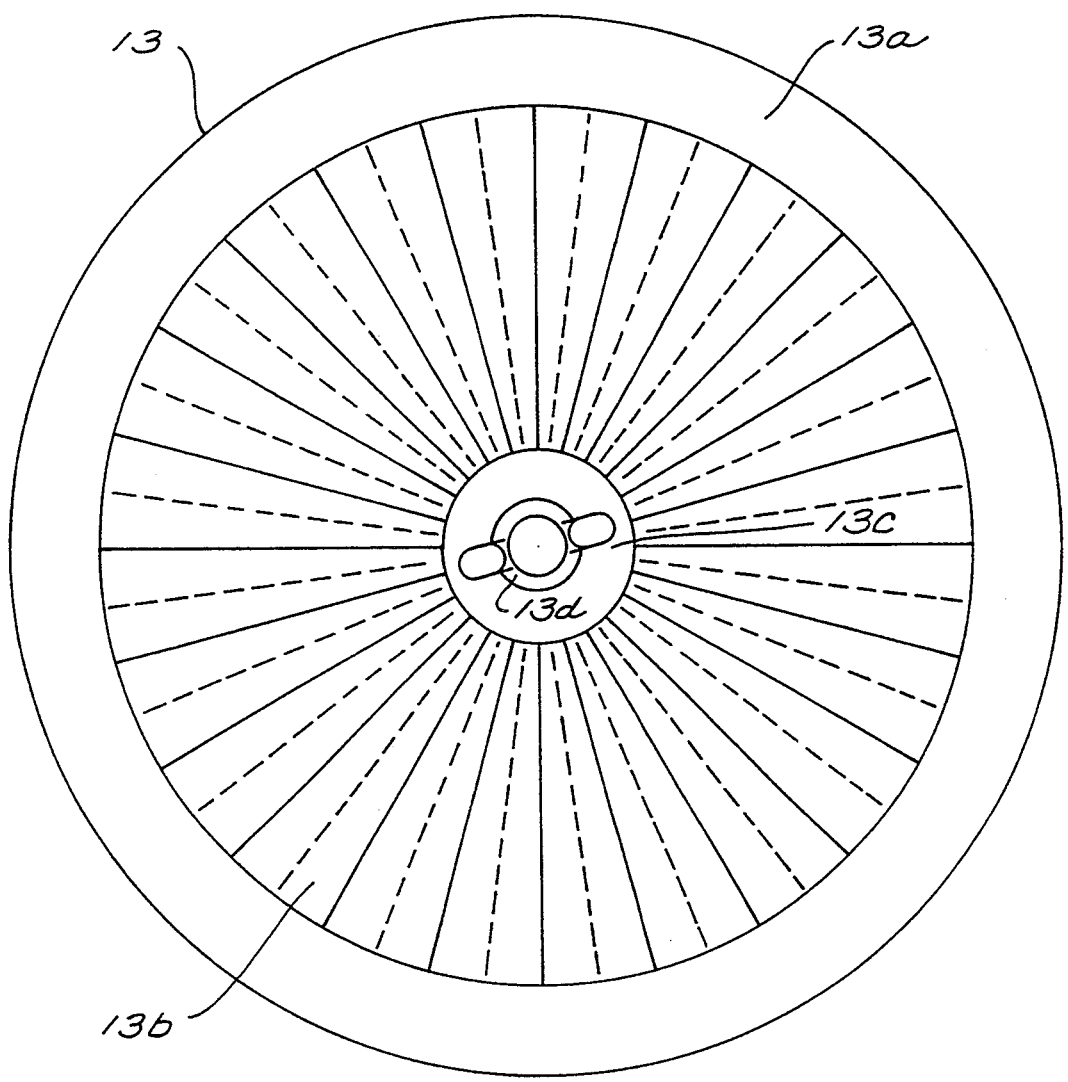
FIG. 2 shows a top view of the filtering cover.

FIG. 2 shows a top view of the invention. A low profile wing nut 13d secures retaining means 13c. In this embodiment, filter element 13b is sufficiently rigid so that retaining means 13c need only be relatively small.

Corrugated filter element 13b is shown by the solid and dashed lines, solid lines indicating peaks and dashed lines indicating valleys of the filtering material.

Figure 3A:
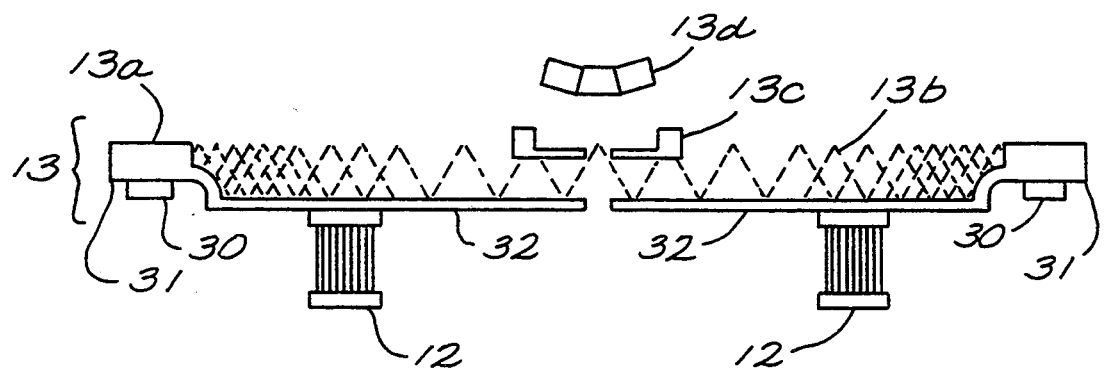
FIG. 3a shows the preferred embodiment of the filtering cover.

FIG. 3a shows a side view of the preferred embodiment.

Rubber gasket 30 is attached to the underside of outer ring 31 of perforated frame 13a. Rubber gasket 30 ensures an air tight seal between perforated frame 13a and air cleaner body (not shown). The perforated portion 32 of perforated frame 13a is recessed so that it contacts cylindrical air filter 12 when filtering cover 13 is installed.

Corrugated filter element 13b rests on top of perforated frame 13a and is secured by a small retaining means 13c. Wing nut 13d secures all of the parts together when it is threaded to air cleaner bold(not shown).

Figure 3B:
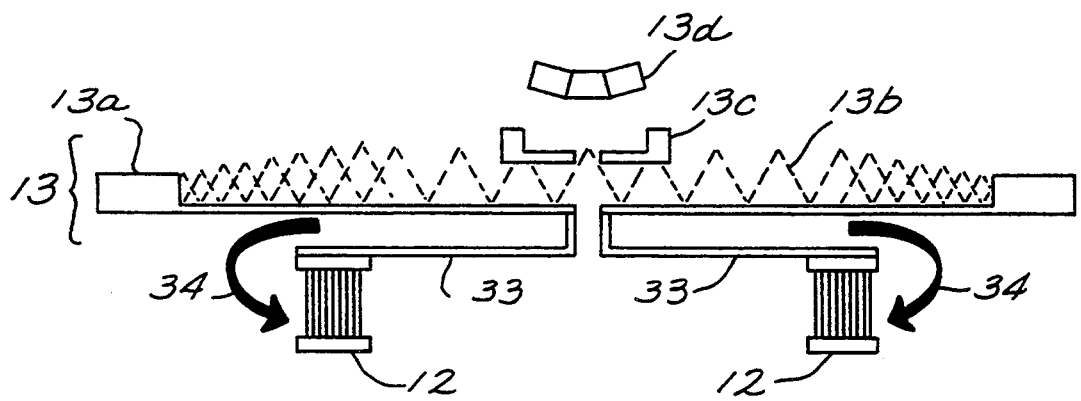
FIG. 3b shows an alternate embodiment of the filtering cover.

FIG. 3b shows a side view of an alternate embodiment.

Deflector plate 33 is added to this embodiment which deflects air passing through filtering cover 13, as shown by arrows 34, to also pass through cylindrical air filter 12. In this embodiment, all air passing through the filtering cover 13 is double filtered. That is, air is filtered first by the filtering cover 13 and then by cylindrical air filter 12. The filtering cover 13, in this embodiment, is essentially a backup filter for the cylindrical air filter 12. Also, distributing air evenly around the perimeter of cylindrical air filter 12 improves the efficiency of cylindrical air filter 12.

Figure 3C:
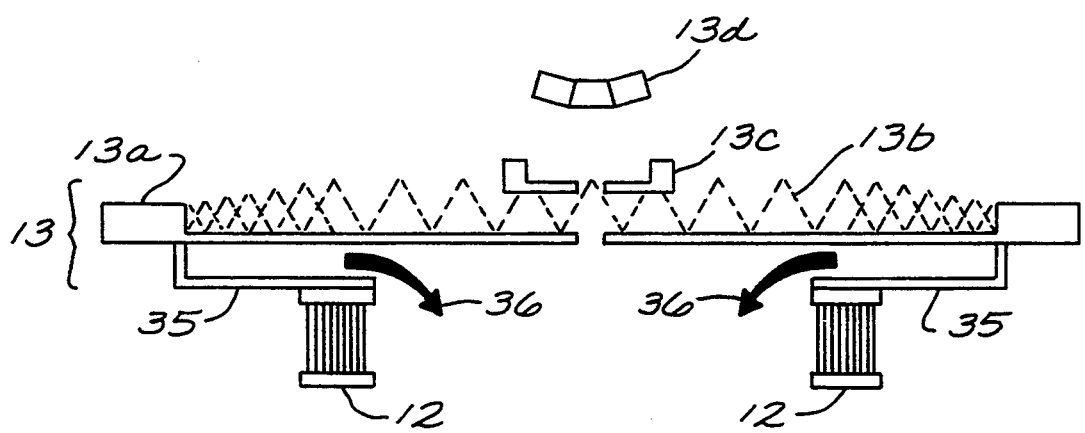
FIG. 3c shows another alternate embodiment of the filtering cover.

In yet a third embodiment, shown in FIG. 3c, deflector plate 35 is modified to deflect air passing through the filtering cover 13 directly into the engine (not shown), thus bypassing cylindrical air filter 12. In this embodiment, no air is filtered twice, thus minimizing restriction of air flow into the engine.

Figure 4:
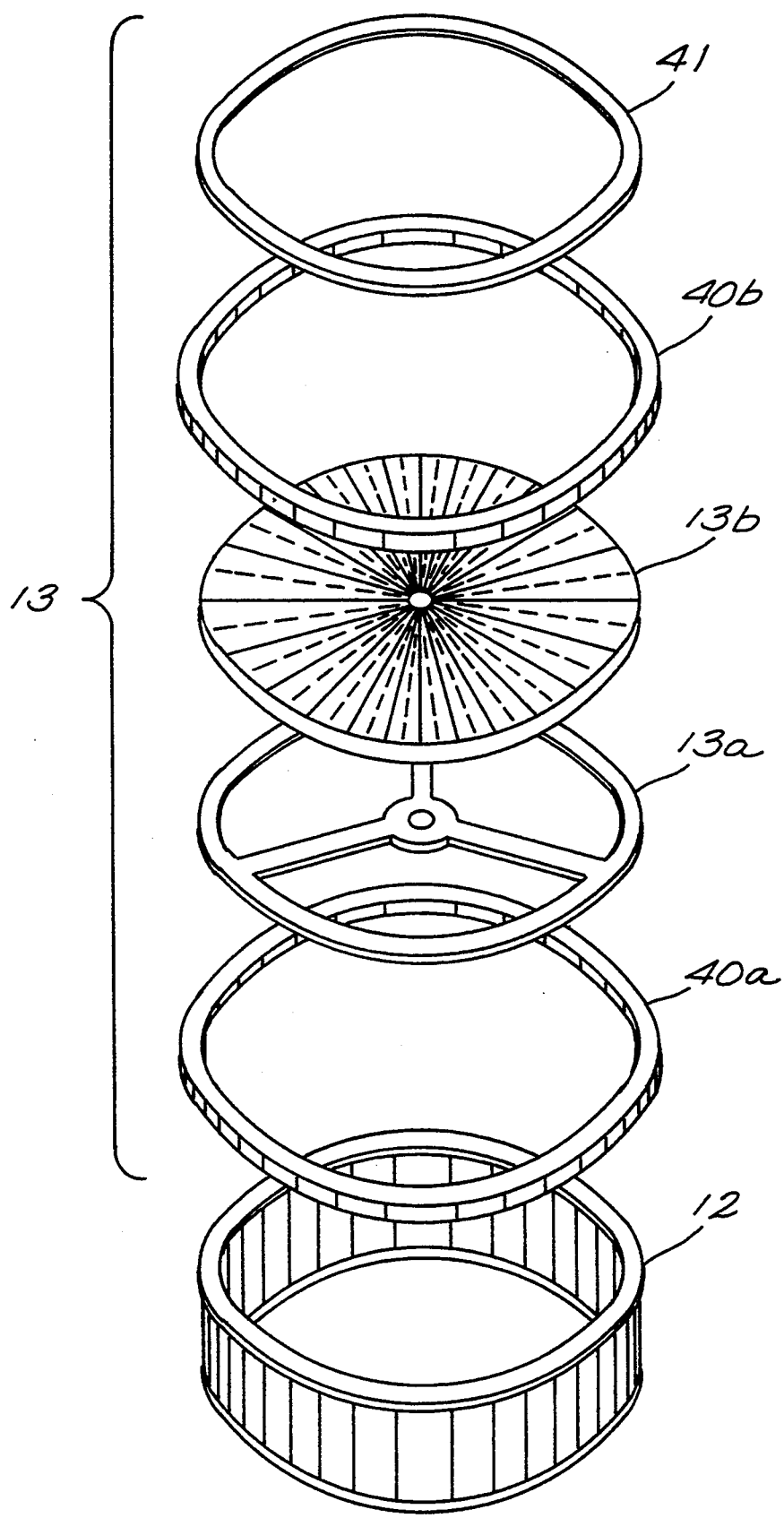
FIG. 4 shows the preferred embodiment of the filtering cover for high performance type air cleaners.

A forth embodiment is shown in FIG. 4. This is the preferred embodiment for high performance type air cleaners.

High performance type air cleaners do not have an air cleaner body which restricts air flow to the air filter. High performance air cleaners are essentially comprised of a cylindrical air filter and a non-perforated cover, both of which are mounted to the engine via an air cleaner bolt and a wing nut.

The invention replaces the non-perforated cover with the filtering cover 13 shown in FIG. 4. In this embodiment, filtering cover 13 is comprised of a lower gasket 40a, a perforated frame 13a, a filtering element 13b, an upper gasket 40b and a support ring 41.

In this preferred embodiment, lower gasket 40a and upper gasket 40b are made of rubber or similar materials. All elements of filtering cover 13 are permanently bonded together by either adhesive, heat sealing the rubber gaskets 40a and 40b, stitching, or other suitable methods.

Gaskets 40a and 40b are made of rubber or similar material. Perforated frame 13a is made of plastic and filtering element 13b is made of any of the materials as discussed earlier. Both perforated frame 13a and filtering element 13b are slightly smaller diameter than gaskets 40a and 40b to aid in bonding lower gasket 40a and upper gasket 40b together.

Support ring 41 is made of a metal material and is adhesively bonded to upper gasket 40b. Support ring 41 gives filtering cover added support. Without support ring 41, filtering cover 13 is easily bent, twisted or otherwise deformed.

Filtering cover 13 is secured to the engine (not shown) via air cleaner bolt (not shown) and wing nut (not shown) as described in previous embodiments.

Those of ordinary skill in the art readily see many alternate embodiments of this invention which do not significantly depart from the teaching of this invention. The drawings and specification have described several embodiments of the invention. These descriptions are for descriptive purposes only, and are not intended to limit the scope of the invention.

It is clear from the foregoing that the present invention represents a new and useful apparatus for filtering air for an internal combustion engine which both improves the performance and operation of the engine.

What is claimed is:

1. An air cleaning apparatus for internal combustion engines comprising:
   a) a substantially bowl shaped air cleaner body having,
      1) a sidewall portion,
      2) a bottom portion,
      3) an air inlet aperture formed in said sidewall portion,
      4) an air outlet aperture formed in said bottom portion, and,
      5) a top opening;
   b) a cylindrical air filter positioned inside said air cleaner body; and,
   c) a filtering cover, said filtering cover covering said top opening of said air cleaner body and filtering air which passes through said filtering cover and into the cavity formed by said air cleaner body and said filtering cover, said filtering cover having,
      1) a filtering element, and,
      2) a perforated frame means for supporting said filtering element.

2. The air cleaning apparatus according to claim 1 wherein said filtering element is corrugated to increase the filtering surface area.

3. The air cleaning apparatus according to claim 2 wherein said filtering element is permanently attached to said perforated frame means.

4. The air cleaning apparatus according to claim 2 wherein said filtering element is removable from said perforated frame means and further including means for removably securing said filtering element to said perforated frame means.

5. The air cleaning apparatus according to claim 4 wherein said filtering element is made of reusable oil type filter material.

6. The air cleaning apparatus according to claim 5 further comprising seal means attached to said perforated frame means of said filtering cover for providing a seal between said filtering cover and said air cleaner body.

7. The air cleaning apparatus according to claim 6 wherein said perforated frame means is rubberized.

8. The air cleaning apparatus according to claim 7 further including deflector means attached to said perforated frame means for deflecting air drawn through said filtering cover such that said air is drawn through said air filter before entering said engine.

9. The air cleaning apparatus according to claim 7 further including deflector means attached to said perforated frame means for deflecting air drawn through said filtering cover such that said air is drawn into said engine without passing through said air filter.

10. An internal combustion engine comprising:
    a) an engine having a inlet for receiving air; and,
    b) an air cleaner assembly having,
       1) a substantially bowl shaped body portion,
       2) an air inlet aperture formed in a sidewall portion of said body portion,
       3) an air outlet aperture formed in a bottom portion of said body portion, said air outlet aperture in communication with said inlet of said engine,
       4) a cylindrical air filter positioned in an interior portion of said body portion such that air coming in said air inlet aperture passes through said air filter before exiting through said air outlet aperture, and,
       5) a perforated filtering cover covering said bowl shaped body portion and forming a cavity enclosing said cylindrical air filter and filtering air which flows through said filtering cover and into the cavity.

11. The internal combustion engine according to claim 10 wherein said filtering cover comprises:
    a) filtering element means for filtering air; and,
    b) a perforated frame means for supporting said filtering element means.

12. The internal combustion engine according to claim 11 wherein said filtering element means is removable from said perforated frame means and further comprising means for securing said filtering element means to said perforated frame means.

* * * * *